[15] 3,662,373
[45] May 9, 1972

Schumann

| [54] | INFORMATION DISPLAY SYSTEM |
| --- | --- |
| [72] | Inventor: Robert W. Schumann, Madison, Wis. |
| [73] | Assignee: Fabri-Tek Instruments, Inc., Madison, Wis. |
| [22] | Filed: Feb. 26, 1970 |
| [21] | Appl. No.: 14,488 |

[52] U.S. Cl.................340/324 A, 250/229, 250/237 R, 324/121 R, 340/212, 350/266
[51] Int. Cl..............................................G08b 5/22
[58] Field of Search............340/324 A; 324/121 R; 250/229, 250/237 R; 350/266

[56] References Cited

UNITED STATES PATENTS

| 2,365,601 | 12/1944 | Sipman..................340/228 S |
| 3,241,064 | 3/1966 | Bartels et al. .........324/121 R |
| 3,277,372 | 10/1966 | Hegeman...............324/121 R |
| 3,317,783 | 5/1967 | Neumeister..............315/26 |
| 3,346,853 | 10/1967 | Koster et al............340/324 A X |
| 3,406,387 | 10/1968 | Werme..................340/324 A |
| 3,474,438 | 10/1969 | Lauher..................340/324 A |
| 3,171,034 | 2/1965 | Tomasulo et al........250/237 |
| 3,196,278 | 7/1965 | Baker....................250/229 X |
| 3,505,665 | 4/1970 | Lasoff et al. ..........340/324 A |
| 3,521,072 | 7/1970 | Wipson et al. ........250/237 X |
| 3,541,521 | 11/1970 | Koster..................340/324 A X |

*Primary Examiner*—David L. Trafton
*Attorney*—Lew Schwartz

[57] ABSTRACT

Apparatus for providing a numerical display of a selected point on an analog waveform displayed on an analog display device connected to and operated by a digital memory and its associated circuitry, the apparatus including marking circuitry for selectively marking a point on the analog waveform. The marking circuitry is connected to a digital comparator which is in turn connected to compare portions of the memory associated circuitry with a selection counter capable of counting either up or down. Manually operable apparatus is provided so that an operator may control the number of count pulses to the selection counter and the direction of count. As the count is the selection counter varies the marking circuitry provides a visual marking which varies along the analog waveform being displayed, while alpha-numeric readout equipment provides number values for the coordinates of the point being marked.

19 Claims, 7 Drawing Figures

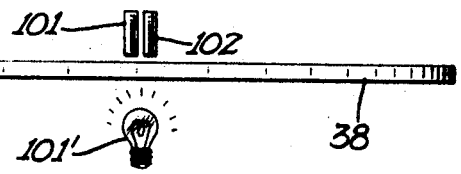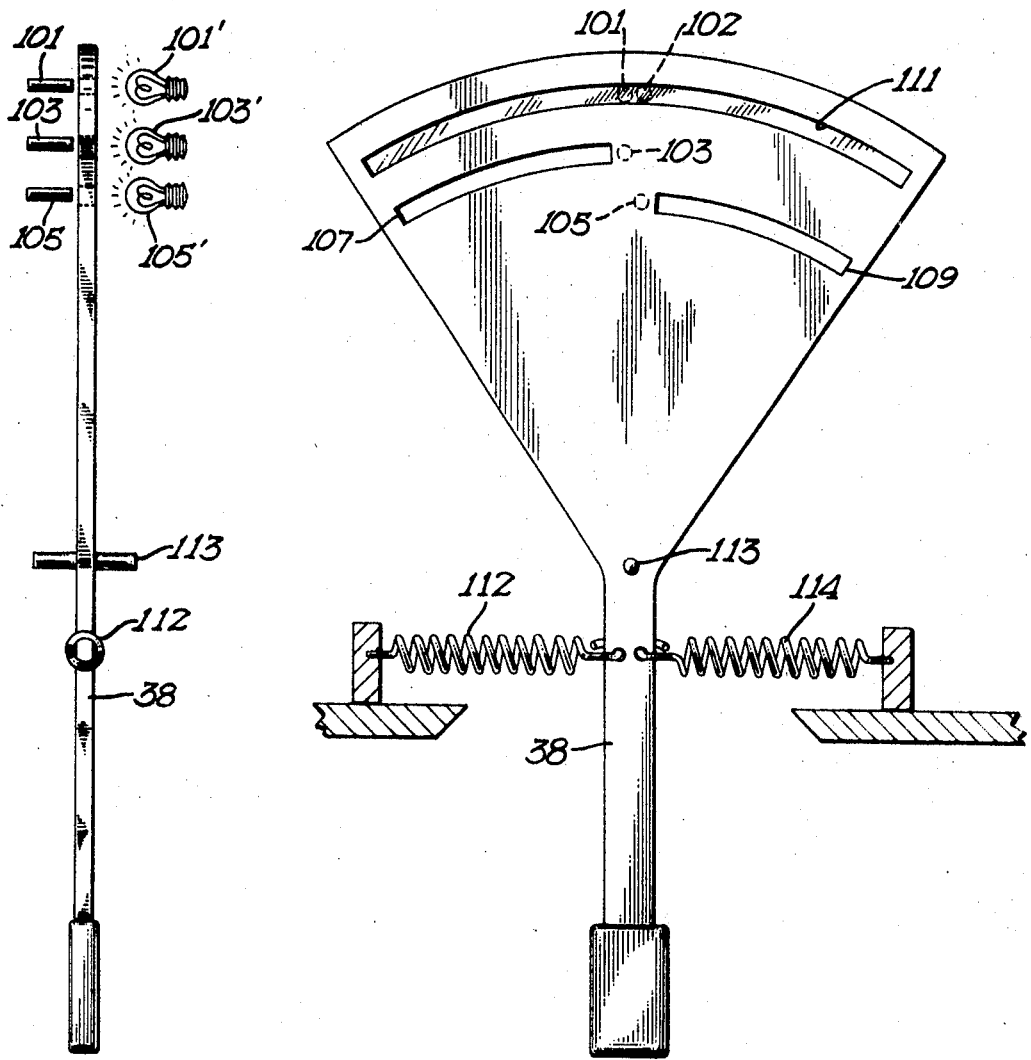

INFORMATION DISPLAY SYSTEM

BACKGROUND OF THE INVENTION

Various apparatus is known in the art for displaying information stored in a digital memory in the form of a rectangular coordinate plot. For example, a voltage waveform may be measured at a number of times and the voltages obtained at each reading may be recorded in successive addresses of a digital memory. The memory may then be read out from the successive addresses into an analog display device which will present a series of coordinate points, the ordinate or vertical position of each dot corresponding to the voltage measured at the particular time, and the abscissa or horizontal position corresponding to the time of measurement. A cathode-ray tube is a device well known in the art to display the set of coordinate points in the form of small light areas on the tube screen. As the readout of the memory is repeated cyclically, the coordinate points on the cathode-ray tube screen appear as a standing waveform. The display may be of a set of coordinate points resulting from a series of measurements of a variable, as described above, or may result from computations or be generated in some other manner.

In such systems, various methods have been found in the art to control the analog display device, such as the cathode-ray tube. Such devices are used to produce the coordinate point positions in a known manner related to the magnitudes of the ordinate and abscissa values involved. As is well known, a coordinate point has an ordinate value and an abscissa value, which may have a linear, exponential or logarithmic relation to the value it represents, or any other convenient relationship. It is only necessary that the operator of the display device, in attempting to garner information from the display, know the relationship of the coordinate points to the values to be determined.

The display described above is often sufficient to provide the information desired by the operator, who may wish only qualitative information or approximate quantitative information relating to the coordinate points. For example, in studying a voltage-time variation, the operator may only be interested in determining if the voltage is periodically changing. However, the operator may require accurate quantitative information from the voltage waveform, such as the time period or the peak amplitude. An analog display of coordinate points as described above is difficult if not impossible to accurately read. A prior art solution to this problem is to provide apparatus for displaying in alpha-numeric form the contents of a selected address, and sometimes the abscissa value as well. For example, one prior art system uses a plurality of binary switches which are set to a state corresponding to the address number of a selected coordinate point, which switches cause the associated coordinate values to be displayed in numerical form. The values thus displayed are easily perceived by the operator. In other prior art devices, the binary switches may be replaced by a keyboard such that depressing the key or keys corresponding to the desired setting causes the desired numerical display.

Such prior art systems are distinctly advantageous, but have the disadvantage of requiring the operator to concentrate on the process of selecting the address for which he desires a display of the coordinate points in numeric form. This means that the operator must remove his visual attention from the analog display, and further that he must make a determination of the memory address number he desires to select. Often the operator does not know the exact address he wishes, as the waveform being displayed on the face of the cathode-ray tube or other analog device may comprise thousands of data points, and an operator interested in a particular coordinate point may only guess the exact address number corresponding to the point of interest according to his visual reading of the waveform.

The apparatus of this invention provides the advantages of the prior art equipment while at the same time providing apparatus by which the operator may continually, and at a rate determined by himself, change the coordinate point being selected for numeric display, which point is being marked along the analog waveform being displayed so that the operator's attention need not be removed from the display. When the marked point has reached the point of interest to the operator, he may stop the selection device and read the numeric display.

SUMMARY OF THE INVENTION

Briefly described, the apparatus of this invention comprises marking circuitry connected to the analog display device of an information display system, for marking a selected coordinate point along the analog waveform being displayed. The marking circuitry is connected to a digital comparator which compares the state of a selection counter to the state of particular circuitry in the readout apparatus for a digital memory, which apparatus is providing the information to the analog display device. A manually operated lever is provided by which the operator may vary the state of the selection counter by adding or subtracting counts. By so changing the state of the selection counter, the operator causes the signal to the marking circuitry to constantly vary, and thus causes the marked coordinate point along the analog waveform to move along the waveform until the point he desires to read is marked. Alphanumeric display devices are provided which read out the selected coordinate point being displayed in, for example, its ordinate and abscissa values. In the preferred embodiment described below, the operator may control, by means of the same lever, the rate at which the mark or selected coordinated point varies along the analog waveform being displayed.

BRIEF DESCRIPTION OF THE DRAWING

FIG. 4 comprises a front plane view of the marker position lever control apparatus of this invention;

FIG. 4a comprises a top view of the apparatus of FIG. 4;

FIG. 4b comprises a side view of the apparatus of FIG. 4; and

DESCRIPTION OF THE PREFERRED EMBODIMENT

For the purposes of simplicity of disclosure of this invention, it will be assumed throughout this description that the ordinate values of the coordinate points are recorded in successive memory addresses. It is apparent that this need not be the actual case, but as it is a usual case and a simple case it will be useful for purposes of this discussion. Further, for purposes of simplicity of disclosure of the invention, it will be assumed in this specification that the abscissa values of the coordinate points are equal to the memory address numbers into which the coordinate values are stored. Obviously this is a special case; and this assumption is made only to simplify the description of the apparatus of this invention. The operator of the information display system must generally know the relationship between memory address and actual abscissa value, or a number representing the actual abscissa value must be recorded in the memory in some known position, such as in the same memory address as the ordinate value, to make available to the display circuitry information indicating that abscissa value. The operation of the apparatus of this invention is adequately illustrated by using the simple case in which abscissa values are successive positive integers beginning with 1 through N, and the memory address numbers 1 through N are used to record the corresponding ordinate values. It will thus be apparent that the analog display will consist of a plot of ordinate values versus abscissa values, or in this case ordinate values versus memory address number, and that N displayed data points are involved in the analog waveform being displayed.

Figure 1:
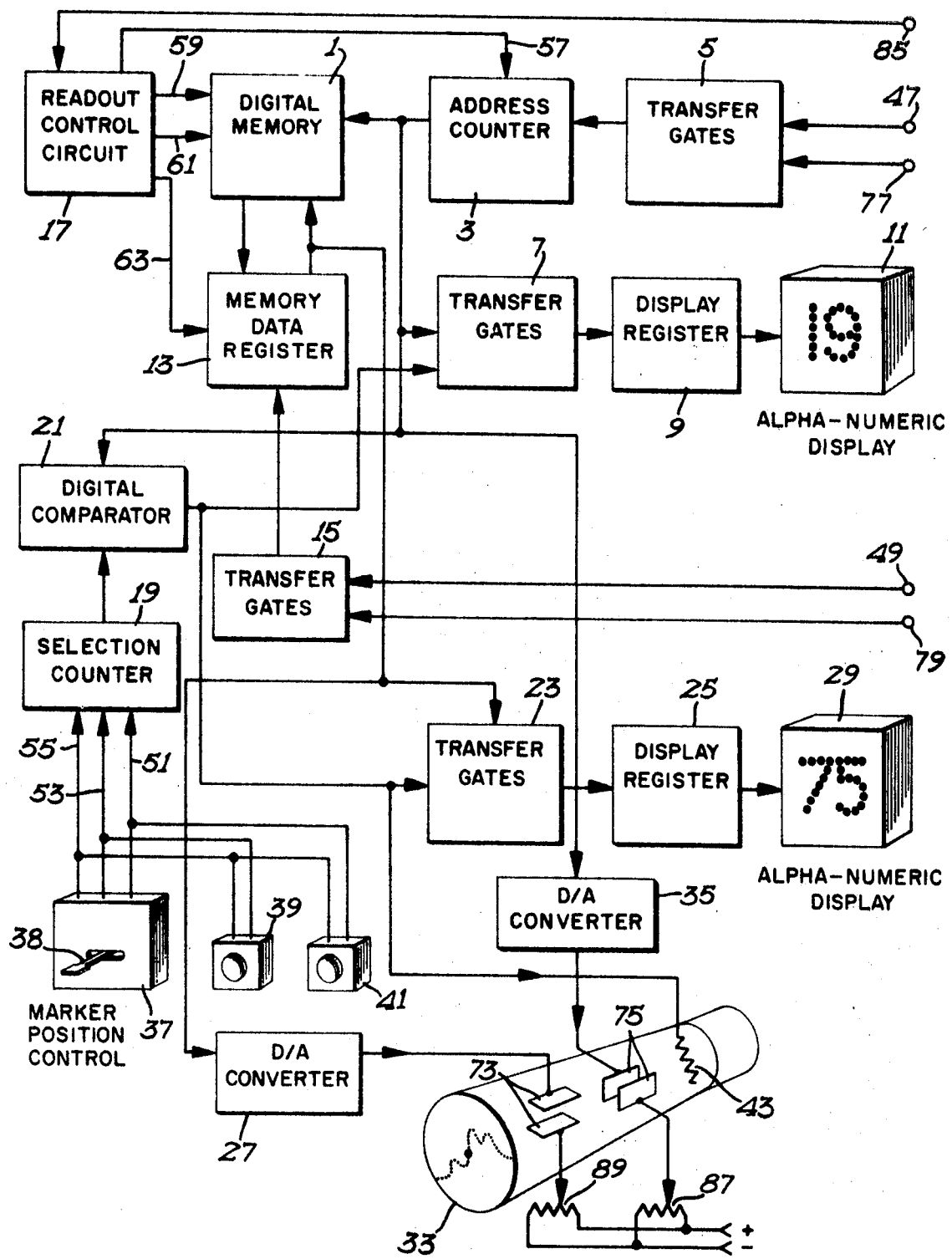
FIG. 1 discloses a block diagram of an information data display system incorporating the apparatus of this invention.

Referring now to FIG. 1 there is shown a digital memory 1, having associated read-write circuitry including an address counter 3 and a memory data register 13. A set of transfer gates 5 is provided for transferring information to address counter 3 in a manner well known to those skilled in the art. Transfer gate 5 is shown connected to an address input terminal 47 and a transfer address input terminal 77 for providing control of address counter 3 for operation of memory 1. A memory data register 13 is connected to both provide information to and receive information from memory 1. A plurality of transfer gates 15 are connected to provide information to memory data register 13, and are connected to receive information from a data input terminal 49 and a transfer data input terminal 79. It is apparent that the apparatus described in this paragraph is well known to those skilled in the art, as is its operation. It is also apparent that in the block diagram of FIG. 1 single lines and in some cases single input terminals have been used to represent what actually would be a plurality of lines and terminals for carrying a plurality of bits of information.

Also shown in FIG. 1 is a readout control circuit 17, which has an input terminal connected to a display command input terminal 85, a step output line 57 connected to address counter 3, a read output line 59 connected to memory 1, a write output line 61 connected to memory 1 and a clear output line 63 connected to memory data register 13.

The full operation of control circuit 17 will be described below in the discussion of FIG. 2, but the operating characteristics will now be described. When a display command input signal is present at terminal 85, control circuit 17 generates a plurality of step pulses on line 57 at a periodic rate. Within a short time after each such step pulse occurs, a clear pulse is generated on line 63 to clear data register 13. A memory read command is then generated on line 59, immediately followed by a write command online 61. The result of these four sequential command pulses is to cause the contents of memory 1 to be read, in sequential address fashion, into data register 13, non-destructively. The output of data register 13 will be fed through a digital to analog convertor 27 which will provide an output voltage proportional to the input digital information to a vertical deflection plate 73 of a cathode-ray tube 33. The output of address counter 3 will be fed through another digital to analog convertor 35 the output of which is connected to the horizontal deflection plates of cathode-ray tube 33. As the output command pulses from readout control circuit 17 continue to occur sequentially as long as a display command is at terminal 85, there will be a resulting display on the face of cathode-ray tube 33 comprising a set of coordinate points corresponding to each address read from memory 1. For the purposes of this preferred embodiment, the vertical or ordinate position of each dot will be a linear function of the corresponding memory address contents, and the horizontal or abscissa position of each dot will be a linear function of the corresponding memory address number. Due to the cycle time provided from readout control circuit 17, the analog waveform on the face of tube 33 comprised of the set of coordinate points will appear as though steady to the human operator. A horizontal position adjust 87 is connected to horizontal deflection plate 75 and a vertical position adjust 89 is connected to vertical deflection plates 73, to allow the operator to position the analog display or array of dots as desired, in the well known manner.

There is also shown in FIG. 1 a digital comparator 21 of the type well known in the art. Comparator 21 has an input connected to the output of address counter 3 and another input connected to the output of a selection counter 19, for comparing the states of counter 3 and counter 19. Comparator 21 has its output connected to a set of transfer gates 7, another set of transfer gates 23, and to a beam control grid 43 of cathode-ray tube 33. If comparator 21 senses a comparison between counters 3 and 19, a command appears at its output. As the output of address counter 3 is also connected to transfer gate 7, the appearance of an output from comparator 21 will cause the contents of counter 3 to pass through gate 7 to a display register 9 which is in turn connected to an alpha-numeric display device 11. As the output of memory data register 13 is also connected to transfer gates 23, the appearance of an output signal on comparator 21 will cause the contents of register 13 to pass through gates 23 to display register 25, which is in turn connected to alpha-numeric display 29. Finally, the appearance of an output at digital comparator 21 will be felt on the beam control grid 43 of cathode-ray tube 33 to intensify the beam, as depicted in caricature on the screen of tube 33. It is thus apparent that when there is a predetermined comparison between the state of selection counter 19 and a selected portion of the digital memory read-write circuitry, in this case address counter 3, there will be a marking of the coordinate point being displayed while there will at the same time be an alpha-numeric display of the ordinate and abscissa values of the marked coordinate point.

Selection counter 19 is preferably a binary up-down counter, or reversible counter, which changes state by one count for each input pulse, the direction of count being selectable. A marker position control 37 is shown in FIG. 1 as having a control lever 38 adapted to be manually controlled by the operator of the apparatus of this invention. Marker position control 37 has three outputs connected to corresponding inputs on selection counter 19. Output 51 comprises a "left-direction" output signal for moving the marked coordinate point on the face of tube 33 to the viewer's left, which in the apparatus of this preferred embodiment provides a count-down signal to counter 19. Output line 53 provides a "right-direction" signal to counter 19, causing the marked coordinate point to move to the operator's right on the face of tube 33, constituting a count-up signal to selection counter 19. Output line 55 constitutes the line on which output pulses appear. The operation of the apparatus of marker position control 37 and lever 38 will be more fully described below. However, position control 37 does have the following properties. Lever 38 is spring-loaded in such a manner as to return to its center position when released. When near the center position, no pulses are produced on output line 55, and no signals are produced on lines 51 and 53. When the lever is moved left or right, count pulses are produced on line 55, the frequency of occurrence of these pulses being approximately proportional to the amount of deflection from center of lever 38. When lever 38 is moved to the left, a signal is produced on line 51, and when lever 38 is moved to the right, a signal is produced on line 53.

As lever 38 is moved, position control apparatus 37 provides corresponding count pulses and count direction signals to selection counter 19. Therefore, the state of selection counter 19 is altered, comparator 21 will provide its output signal only after address counter 3 has changed to provide a comparison with counter 19, and a new coordinate point on the face of tube 33 will be marked while the numerical values of the abscissa and ordinate of this new coordinate point are displayed. The operator need only watch the movement of the marked, in this case brightened, point on the analog waveform being displayed until it reaches the coordinate point he desired information about. He may then stop motion of the marked point by returning the lever to its center position, and read the abscissa and ordinate values of the coordinate point from alpha-numeric displays 11 and 29.

It is to be noted that because transfer gates 7 and 23 will transfer information from address counter 3 and data register 13, respectively, only when a signal appears at the output of digital comparator 21, it does not matter what may cause a change in the states of address counter 3 or memory data register 13. Numerical displays 11 and 13 will still indicate those values which existed the last time the state of address counter 13 compared to the state of selection counter 19. Furthermore, the position at any moment of the beam of cathode-ray tube 33 is such as to indicate the current states of memory data register 13 and address counter 3. It may well happen that the external circuits operative on terminals 47, 77, 49 and 79 will cause a sequential address data alternation in memory 1. Nonetheless, the coordinate plot shown on numerical displays 11 and 29 are just as effective as when control circuit 17 is in operation. Displays 11 and 29 show the most recent ordinate values recorded in memory 1 in that case, along with the address number of the selected address, and the point on the screen of tube 33 corresponding to the displayed numbers will be indicated by the increased brightness of one point.

In the preferred embodiment of FIG. 1 there are also shown a pair of pushbuttons 39 and 41. Operation of the respective pushbutton will cause a single pulse to be felt at selection counter 19 to change the count by one pulse in the right or left direction, respectively. In the apparatus of the preferred embodiment described in FIG. 1, this change by a single pulse will move the marker on the waveform on the screen of tube 33 one coordinate point left or right, as selected by the operator for his convenience.

Figure 2:
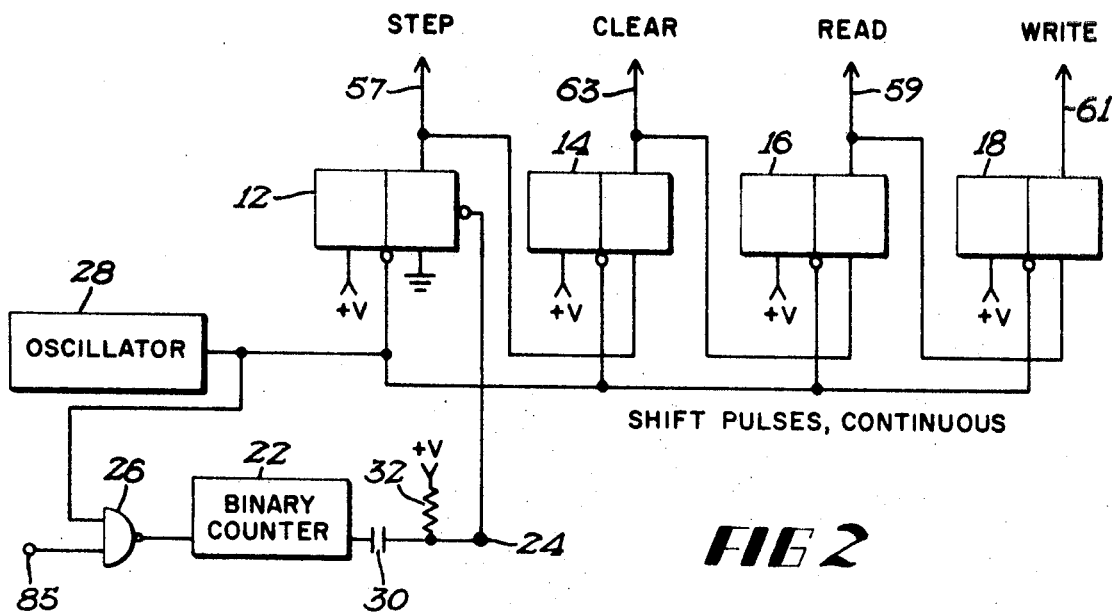
FIG. 2 comprises a schematic and block diagram of the readout control circuit of FIG. 1.

Referring now to FIG. 2, there is shown a block diagram of the internal circuit of readout control circuit 17. An oscillator 28 is connected to the inputs of four JK flip-flops 12, 14, 16 and 18. Flip-flops 12 through 18 are interconnected into a shift register. The output of oscillator 28 is also connected to the input of a gate 26. Another input of gate 26 is connected to a display command input terminal 85. The output of gate 26 is connected to a binary counter 22. The output of counter 22 is connected through a capacitor 30 to a terminal 24. Terminal 24 is connected to the trigger input of flip-flop 12, and is connected by a resistor 32 to a source of positive voltage indicated as plus V. An output of flip-flop 12 is connected to step output line 57 and to the input of flip-flop 14; an output of flip-flop 14 is connected to clear output line 63 and to an input of flip-flop 16; an output of flip-flop 16 is connected to read output line 59 and to an input of flip-flop 18; and an output of flip-flop 18 is connected to write output line 61.

Normally, all four shift register flip-flops 12, 14, 16 and 18 are in the "zero" state, so that output lines 57, 63, 59 and 61 do not provide signals to the respective circuitry to which they are connected as seen in FIG. 1. Binary counter 22 is connected to be a ripple-carry binary counter, which counts at approximately the same rate at which oscillator 28 oscillates. The output of oscillator 28 will reach binary counter 22 only when a display command is present at terminal 85 to energize or open gate 26.

In the preferred embodiment of FIG. 2, assume that oscillator 28 is adjusted to have a frequency of approximately 250 kilohertz. Binary counter 22 comprises a seven stage counter which will count at a 250 kilohertz rate when gate 26 is open, so that the last stage or output of binary counter 22 will change state from "1" to "0" at approximately a 2 kilohertz rate. As the output of counter 22 passes through capacitor 30 a negative pulse will occur at junction 24 after each 128th oscillator output pulse. This pulse at junction 24 causes flip-flop 12 to change states and put an affirmative signal on step line 57 for approximately two microseconds, when the next negative shift pulse transition occurs from the direct input from oscillator 28. The affirmative signal will thereafter proceed through the shift register comprising the four flip-flops 12-18 to sequentially turn on the four output signals of control circuit 17 in a repeating sequence as long as an affirmative signal is presented to display gate 85.

Figure 3:
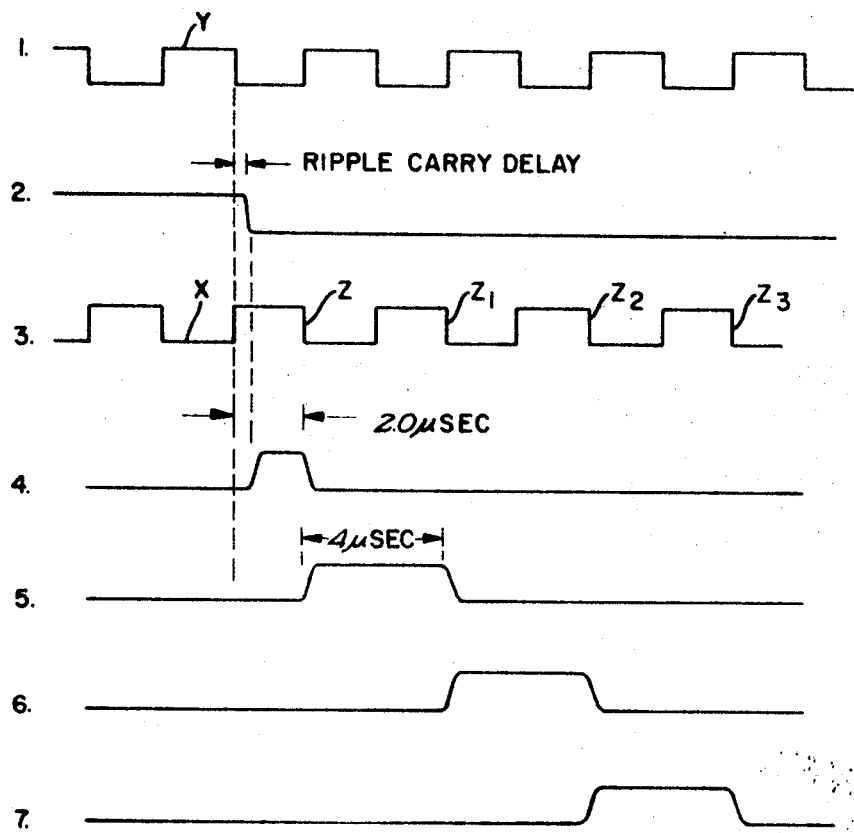
FIG. 3 comprises a timing chart for the circuit of FIG. 2.

Reference is made to FIG. 3 which comprises a timing chart for the circuit of FIG. 2. The top line of the timing chart indicates the pulse output of gate 26, which is seen to be the inverse of the output of oscillator 28 which is shown in the third line. The second line shows the output of counter 22, and the bottom four lines of the timing chart indicate, respectively, the pulses appearing on output control lines 57, 63, 59 and 61. Assume now that pulse $x$ from the output of oscillator 28, which is felt on the input to gate 26 as well as to all the shift terminals of flip-flops 12-18, causes an output from gate 26 of pulse $y$ which in turn is the pulse that causes the last stage of binary counter 22 to change states. Because of the time for the effect of pulse $y$ to be felt through the ripple-carry binary counter 22, there will be a short delay referred to on the graph as the ripple-carry delay before a pulse appears at the output of counter 22, as is shown on the second line of the chart of FIG. 3. This output of counter 22 causes the turn on of flip-flop 12 to cause an output signal to appear on output line 57 as seen in line 4 of the chart. Approximately two microseconds later (two microseconds minus the ripple-carry delay) negative-going pulse z occurs at the output of oscillator 28 as seen on line 3. This pulse constitutes a shift pulse to the shift register comprising flip-flop 12–18. Therefore, the signal on line 57 is turned off as seen on line 4, and the signal on line 63 goes positive as is seen on line 5. Four microseconds later, signal $z_1$ occurs to turn off the signal on output line 63 and turn on the signal on output line 59 as seen in line 6 of the chart. Again four microseconds later, signal $z_2$ occurs to turn off the signal on line 59 and turn on the signal on line 61, shown in line 7 of the chart. Finally, the four sequential control signals are completed when signal $z_3$ occurs to turn off the signal on output line 61.

Though it is apparent that other designs may be used for readout control circuit 17, the circuit shown and described in FIGS. 2 and 3 does produce the desired four output pulse sequence at approximately a 2 kilohertz repetition rate. Further, the circuit shown and described in FIGS. 2 and 3 has the advantages of never failing to produce all four command pulses regardless of when the display command pulse occurs at terminal 85, and the further advantage of never failing to complete all four pulses in the sequence regardless of when the command pulse at terminal 85 terminates. In the circuit shown and described, the ripple-carry delay is assumed to be significantly under one microsecond to insure that the first signal on output line 57 will not be significantly less than two microseconds.

Referring now to FIGS. 4, 4a and 4b it can be seen that lever 38 is pivotally mounted on a pivot 113 and is yieldingly biased to a center position by a pair of springs 112 and 114. Thus, when pivoted by the operator to change the mark or position as described above with reference to FIG. 1, lever 38 may simply be released by the operator when he has reached his desired mark, and it will automatically return to the center position.

As can be seen in FIG. 4, lever 38 includes a pie-shaped portion having three optical windows 107, 109 and 111. Window 107 is clear and will act in cooperation with a left light sensor 103 and a light source 103', as shown in FIG. 4b, to provide an electrical signal when the handle of lever 38 is moved to the operator's left. Window 109 is also a clear window which will cooperate with right light sensor 105 and light source 105' to provide an electrical indication when the handle of lever 38 is moved to the operator's right. In the preferred embodiment, window 111 comprises a variable opacity window which cooperates with a pair of light sensitive position sensors 101 and 102 and a light source 101' to provide a variable output as lever 38 is actuated to change the opacity between source 101' and sensors 101 and 102.

Though it will be apparent that other lever designs will be useful in the apparatus of this invention, the design of FIGS. 4, 4b and 4a is the preferred embodiment because it has the advantage that the moving lever need do no work other than that against springs 112 and 114, thus it will be easy to move and have no significant friction on sensing items, along with a positive return to neutral when released by the operator. The signals produced by the changing light impinging on light sensors 101, 102, 103 and 105 must be operated on by electrical circuitry to provide count and direction pulses to direction counter 19. The preferred embodiment of such circuitry is shown in FIG. 5 and more fully described below.

Variable opacity window 111 allows an amount of light to pass between source 101' and light sensors 101 and 102, which in the preferred embodiment may be variable resistance photosensitive cells, the amount of light being a function of the deflection of control lever 38 from its neutral or center position. The relationship between light transmission and angle is optional, but for simplicity it is in this preferred embodiment considered to be approximately linear, with a minimum of light transmission when in the neutral position. As stated above, windows 107 and 109 are clear, and allow one or the other of light sensors 103 and 105 to be fully illuminated, or dark. Preferably, sufficient friction is provided by pivot 113 and its bearings to prevent oscillations when lever 38 is released and allowed to be spring returned to center position.

Figure 5:
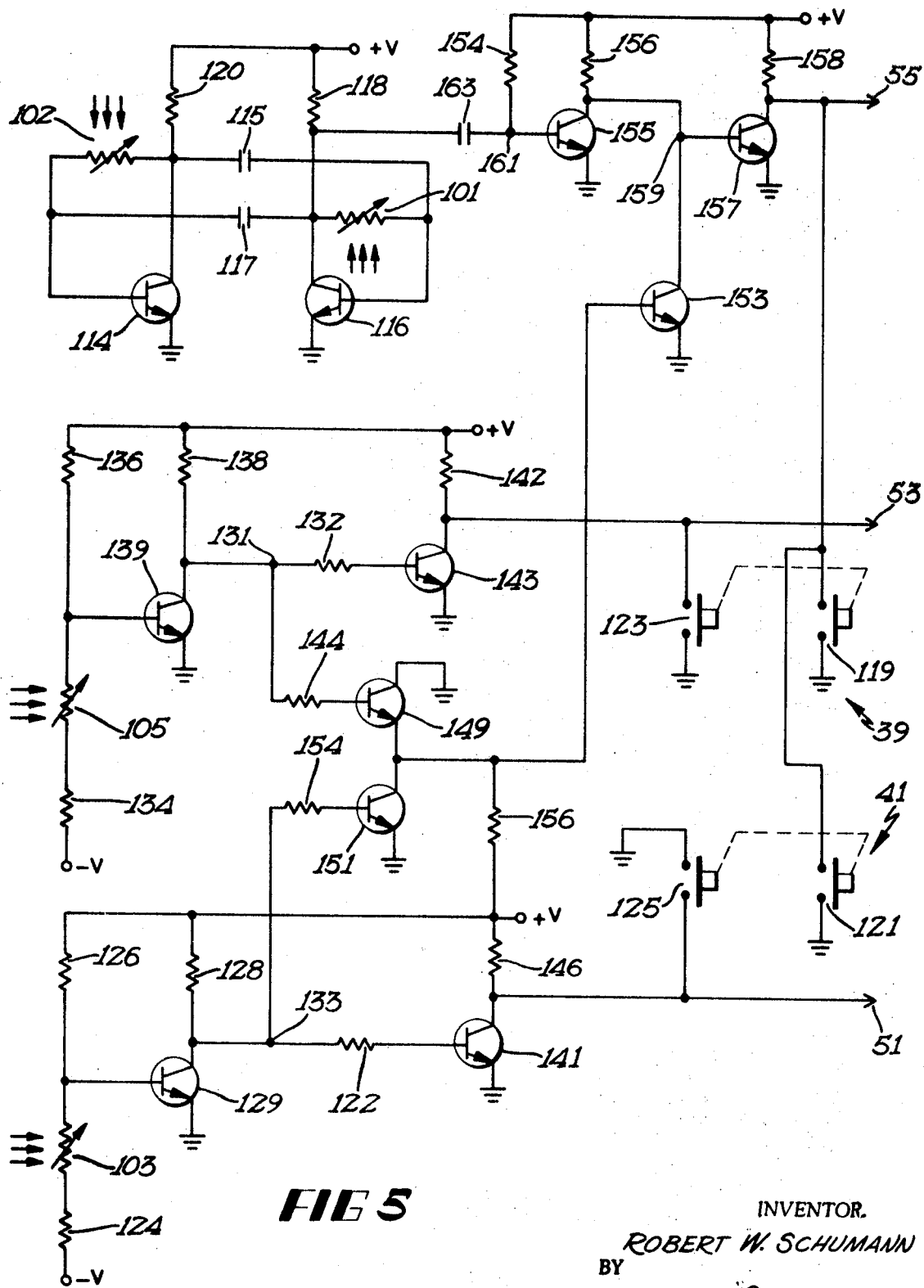
FIG. 5 comprises a schematic diagram of the electronic circuitry for marker direction and rate control.

Referring now to FIG. 5, there is shown a schematic diagram of the direction and rate control circuitry of marker position control 37, for supplying direction and counter information to selection counter 19. It can be seen that in the preferred embodiment described herein, light sensors 101 and 102 are equivalent to variable resistors, the resistance of which decreases as more light impinges upon them. Sensors 101 and 102 are connected in the timing circuits of a multivibrator which includes a pair of transistors 114 and 116. The emitters of each of transistors 114 and 116 are connected directly to ground. The collector of transistor 114 is connected through a bias resistor 120 to a positive source of voltage indicated as plus V, and the collector of transistor 116 is connected through a resistor 118 to plus V. A coupling capacitor 115 connects the collector of transistor 114 to the base of transistor 116, while another coupling capacitor 117 connects the collector of transistor 116 to the base of transistor 114. Light sensor 101 is connected between the base and collector of transistor 116, while light sensor 102 is connected between the base and collector of transistor 114.

In operation, when the handle of lever 38 is moved by the operator to the left, there is an increase in the amount of light impinging upon light sensors 101 and 102. The further the leftward movement, the more light. As shown herein, sensors 101 and 102 are the type that have a resistance which decreases as the amount of incident light increases. Therefore, as will be apparent from the above described multivibrator connections, the frequency of oscillation of the multivibrator will increase as the resistances of sensors 101 and 102 decrease, so that output pulses occur at a frequency or rate which increases as the position of the lever 38 is moved left or right from center.

The collector of transistor 116 is connected through a capacitor 163 to a junction 161. Junction 161 is connected to the base of a transistor 155, and through a resistor 154 to plus V. The collector of transistor 155 is connected through a resistor 156 to plus V, and to a junction 159. The emitter of transistor 155 is connected to ground. Junction 159 is connected to the base of a transistor 157 and the collector of a transistor 153. The emitter of transistor 153 is connected to ground, while the base of transistor 153 is connected through a resistor 156 to plus V. The emitter of transistor 157 is connected to ground, while its collector is connected through a resistor 158 to plus V. The collector of transistor 157 is also connected to output line 55, the output count pulse line as shown and described in the discussion of FIG. 1 above.

Therefore, the output pulses from the multivibrator will pass through capacitor 163 to cause positive signals to appear on the base of transistor 155 to turn it on to supply pulses to the base of transistor 157. However, as transistor 153 has its base connected through resistor 156 to a plus voltage, it is held permanently on and will hold transistor 157 off until the voltage on the base of transistor 153 is increased to turn transistor 153 off. In FIG. 5, it can be seen that right and left direction sensors 105 and 103 are connected in amplifier circuits for providing direction signals 53 and 51, and for unblocking the output signals to output line 55. A transistor 139 has its emitter connected to ground, its collector connected through a resistor 138 to plus V, and its base connected through a resistor 136 to plus V and through a serial combination of sensor 105 and a resistor 134 to a negative voltage minus V. The collector of transistor 139 is also connected to a junction 131. Junction 131 is connected through a resistor 132 to the base of a transistor 143. Transistor 143 has an emitter connected to ground and a collector connected through a resistor 142 to plus V. The collector of transistor 143 is also connected to output line 53 for instructing the selection counter 19 to count in the right or positive direction. Junction 131 is also connected through a resistor 144 to the base of a transistor 149. Transistor 149 has an emitter connected to ground and a collector connected to the base of transistor 153. Thus if transistor 149 is turned on, transistor 153 will be turned off and the output count pulses will be allowed to appear on output line 55.

A transistor 129 has its emitter connected to ground, its collector connected through a resistor 128 to plus V, and its base connected through a resistor 126 to plus V and through a serial combination of direction sensor 103 and a resistor 124 to minus V. The collector of transistor 129 is also connected to a junction 133. Junction 133 is connected through a resistor 122 to the base of a transistor 141. Transistor 141 has its emitter connected to ground and its collector connected through a resistor 146 to plus V. The collector of transistor 141 is also connected to output line 151, which line provides the direction to selection counter 19 to count in the left or negative direction. Junction 133 is also connected through a resistor 154 to the base of a transistor 151. Transistor 151 has its emitter connected to ground and its collector connected to the base of transistor 153, so that the turn on of transistor 151 will also cause the unblocking of count pulses to line 55 in the manner described above.

Light sensors 103 and 105 are normally shielded from their respective light sources 103' and 105' when lever 38 is in its neutral position, as can be seen in FIG. 4. When the handle of lever 38 is moved left, sensor 103 is illuminated and decreases in resistance, as does sensor 105 when the handle of lever 38 is moved to the right. In FIG. 5, voltage on the base of transistor 139, for example, is positive when lever 38 is in its neutral position because sensor 105 is not illuminated. This positive voltage causes transistor 139 to be on thus providing essentially a zero voltage to junction 131. As this zero potential at junction 131 will hold off both of transistors 143 and 149, no signal will appear on output line 53 and no count pulses will appear on line 55. When sensor 105 is caused to decrease in resistance due to light from source 105' when the handle of lever 38 is moved to the right, the voltage on the base of transistor 139 becomes negative turning it off. This in turn causes the voltage at junction 131 to go positive and cause the turn-on of transistors 143 and 149. The turn-on of transistor 149 essentially grounds the base of transistor 153 to turn it off, and thus allow the pulses appearing at junction 159 to be passed through transistor 157 to line 55. At the same time, the turn-on of transistor 143 causes an output signal, negative-going, to appear on output line 53. Therefore, selection counter 19 will receive a direction signal from line 53 and a plurality of counts from line 55, the number of counts and their frequency depending on how long the operator holds lever 38 to the right, and how far to the right lever 38 is held.

It is apparent that the same action would occur in the circuitry associated with left direction sensor 103 should lever 38 be moved to the left, except in this case transistor 143 would remain off but transistor 141 would be turned on to provide a negative-going signal on output line 51, thus changing the direction of count in reversible selection counter 19.

Also shown connected in the circuitry of FIG. 5 are pushbuttons 39 and 41, for moving the marked selected coordinate point of the analog waveform of FIG. 1 one coordinate point to the left or right, respectively. Assume that lever 38 is in its neutral position, and that no light is impinging on sensors 103 and 105. Therefore there will be no signals on lines 55, 53 or 51. In FIG. 5 it can be seen that pushbutton 39 comprises a double-pole, signal-throw switch whereby a pair of contacts 119 and a pair of contacts 123 are each closed with a single push of the button of pushbutton 39. One contact of each of contacts 119 and 123 is connected to ground. The other contact of contacts 119 is connected to output line 55, while the other contact of contacts 123 is connected to output line 53. When button 39 is actuated, both lines 53 and 55 are connected to ground, and thus have a negative-going potential, which constitutes a single signal output on both of lines 53 and 55. Line 53 will give a right direction signal to counter 19, while line 55 will give a single count to line 55.

It can also be seen that pushbutton 41 has a pair of contacts 121 and another pair of contacts 125, in the same manner as does switch 39. One of each of contacts 121 and 125 is connected to ground, while the other contact of contacts 121 is connected to line 55, and the other contact of contacts 125 is connected to line 51. Actuation of pushbutton 41 will cause lines 51 and 55 to go negative, in a manner described above with respect to the actuation of pushbutton 39, but causing a single count in the opposite direction in counter 19. It should be noted that pushbutton switches 39 and 41 are designed such that there is no contact bounce, and that, respectively, switch contacts 123 and 125 close before contacts 119 and 121. This will insure that reversible selection counter is provided with a direction signal prior to receipt of the count signal.

As will be apparent to those skilled in the art, many different circuit designs could be used for reversible or up-down selection counter 19. Further, it will be recognized that though this embodiment includes means for stepping the position of the marker on the screen of tube 33 one coordinate point at a time in either direction, or at a variable rate in either direction, it is obvious that additional controls could be added which cause stepping a fixed number of points greater than one point at a time. It is within the scope of this invention to provide a data point selection change which has a fixed relation to its last position, as distinguished from prior art systems in which selection is on the basis of choosing in advance a particular abscissa value or memory address and causing that coordinate point to be displayed in numerical form, without regard to the address or abscissa value of the previously selected point. The apparatus of this embodiment is preferred because it provides not only means for moving a fixed number of coordinate points in either direction, but also means for providing a variable rate of change of selected point in either direction, both preferable because of ease of operation and simplicity. Finally, it will be apparent that it is within the scope of this invention to provide marking of more than one selected point at a time, and that such marking need not be by brightening the point on the face of a cathode-ray tube, but that other marking methods can readily be devised, such as causing the coordinate point periodically to be absent in order to give a blinking appearance, or causing the coordinate point to assume the shape of a small circle rather than a dot.

What is claimed is:

1. In information display apparatus including means for storing information indicative of coordinate points on an analog curve, means for selectively reading out the information, and display means for providing an analog display of the read information, the improvement comprising: marker means connected to the display means for marking a selected coordinate point on said analog display; counter means for storing a count related to a selected coordinate point; comparator means; said comparator means connecting said counter means to the means for reading out the information for providing a marker signal on selected comparison therebetween; means connecting said comparator means to said marker means for providing said marker signal thereto; control means connected to said counter means for selectively providing count pulses thereto for varying the selected coordinate point in any direction along said analog display; and further display means operatively connected to said marker means for displaying the information indicative of the selected coordinate point in alpha-numeric form.

2. The apparatus of claim 1, in which said control means varies the selected point at a constant rate.

3. The apparatus of claim 1 in which said control means is manually operable and the rate of change of the selected point is controllable by the operator.

4. The apparatus of claim 1 in which said counter means is constructed and arranged to count up or down and said control means includes means for providing count-up pulses or count-down pulses.

5. The apparatus of claim 4 including further means connected to said counter means for providing a predetermined number of count pulses to said counter means.

6. The apparatus of claim 1 including means for providing the count pulses at a constant frequency.

7. The apparatus of claim 1 including means for providing the count pulses at selectable varying frequencies.

8. The apparatus of claim 1 in which the display means includes a cathode-ray tube having beam drive means; and said marker means includes means connected to said beam drive means for selectively varying the intensity of the beam.

9. The apparatus of claim 1 in which said control means comprises: elongated translucent means having variable opacity along its length; light source means mounted adjacent to said translucent means; light sensing means mounted to receive light from said light source means through said translucent means; and means for providing relative movement between said translucent means and said light source means.

10. The apparatus of claim 9 including means yieldingly biasing said translucent means and said light source means to a predetermined relative position.

11. The apparatus of claim 9 in which said means for providing relative movement comprises lever means for carrying said translucent means; said lever means being pivotally mounted for arcuate movement.

12. The apparatus of claim 11 including further sensing means mounted in operative relation to said lever means for sensing the direction of movement thereof.

13. The apparatus of claim 12 in which said marker means comprises reversible counter means.

14. In a data display system including digital memory means, address counter means for controlling data transmission to and from said memory means, memory data register means for storing data being read out of and written into said memory means, analog display means for displaying an analog waveform having coordinate points related to the digital data stored in said memory means, the improvement comprising: first control means connected to said memory means, said address counter means and said memory data register means, for selectively cyclicly reading data out of said memory means; reversible digital counter means; second control means connected to said reversible counter means for providing count pulses thereto and for determining the direction of count caused by the count pulses; digital comparator means; said comparator means connected to said reversible counter means and said address counter means for comparing the states of said counters and for providing a control pulse in the presence of a selected comparison between said counters; means connecting said comparator means to said analog display means for providing said control pulse thereto to mark a selected coordinate point on a displayed analog waveform; digital to analog converter means connected between each of said address counter means and said memory data register means and said analog display means, for providing voltage signals to said analog display means proportional to the digital data stored in said address counter means and said memory data register means; and first and second display register means; means connecting said first display register means to said address counter means; means connecting said second display register means to said memory data register means; and first and second alpha-numeric display means connected, respectively, to said first and second display register means.

15. The apparatus of claim 14 in which said second control means comprises: elongated translucent means having variable opacity along its length; light source means mounted adjacent to said translucent means; light sensing means mounted to receive light from said light source means through said translucent means; and means for providing relative movement between said translucent means and said light source means.

16. The apparatus of claim 15 including means yieldingly biasing said translucent means and said light source means to a predetermined relative position.

17. The apparatus of claim 16 in which said means for providing relative movement comprises lever means for carrying said translucent means; said lever means being pivotally mounted for arcuate movement.

18. The apparatus of claim 17 including further sensing means mounted in operative relation to said lever means for sensing the direction of movement thereof.

19. The apparatus of claim 14 including: further control means for providing a predetermined number of count pulses and a count direction signal to said reversible digital counter means; and means connecting said further control means to said reversible digital counter means.

* * * * *